US010253844B2

(12) United States Patent
Orlamünder et al.

(10) Patent No.: US 10,253,844 B2
(45) Date of Patent: Apr. 9, 2019

(54) TORSIONAL VIBRATING DAMPING ASSEMBLY, IN PARTICULAR MASS DAMPER UNIT

(71) Applicant: ZF FRIEDRICHSHAFEN AG, Friedrichshafen (DE)

(72) Inventors: Andreas Orlamünder, Schonungen (DE); Thomas Dögel, Nüdlingen (DE); Uwe Grossgebauer, Erlabrunn (DE); Christoph Sasse, Schweinfurt (DE); Uwe Noras, Viereth-Trunstadt (DE); Günter Fahl, Sulzfeld (DE); Thomas Walter, Kolitzheim (DE); Armin Stürmer, Rannungen (DE); Thomas Schubert, Grettstadt (DE); Michael Greulich, Schwebeheim (DE); Martin Hertel, Bergrheinfeld (DE); Matthias Fischer, Oerlenbach (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 150 days.

(21) Appl. No.: 15/503,991

(22) PCT Filed: Aug. 4, 2015

(86) PCT No.: PCT/EP2015/067942
§ 371 (c)(1),
(2) Date: Feb. 14, 2017

(87) PCT Pub. No.: WO2016/023795
PCT Pub. Date: Feb. 18, 2016

(65) Prior Publication Data
US 2017/0292586 A1    Oct. 12, 2017

(30) Foreign Application Priority Data
Aug. 14, 2014 (DE) .................... 10 2014 011 952

(51) Int. Cl.
*F16H 45/02* (2006.01)
*F16F 15/14* (2006.01)
*F16F 15/12* (2006.01)

(52) U.S. Cl.
CPC ...... *F16F 15/1421* (2013.01); *F16F 15/1202* (2013.01); *F16H 45/02* (2013.01);
(Continued)

(58) Field of Classification Search
CPC ............................ F16F 15/1202; F16H 45/02
See application file for complete search history.

(56) References Cited

U.S. PATENT DOCUMENTS 5,090,945 A * 2/1992 Graton ............... F16F 15/1202
                                                            464/64.1
9,429,211 B2 * 8/2016 Orlamunder .......... F16F 15/123
(Continued)

FOREIGN PATENT DOCUMENTS

DE    10 2006 046 681    4/2008
DE    10 2012 205794    10/2013
(Continued)

*Primary Examiner* — David R Morris
(74) *Attorney, Agent, or Firm* — Cozen O'Connor

(57) ABSTRACT

A torsional vibration damping arrangement, in particular mass damper subassembly, having a carrier which can be driven in rotation and a damper mass rotatably deflectable with respect to the carrier against the restoring action of a substantially radially extending damper spring. The damper spring is fixedly clamped in the damper mass and is supported or supportable with respect to the carrier for transmitting circumferential force. The damper spring is clamped between clamping elements arranged at both sides of the damper spring in circumferential direction.

16 Claims, 12 Drawing Sheets

(52) U.S. Cl.
CPC .......... *F16H 2045/021* (2013.01); *F16H 2045/0226* (2013.01); *F16H 2045/0284* (2013.01)

(56) References Cited

U.S. PATENT DOCUMENTS

| | | | |
|---|---|---|---|
| 9,556,928 B2* | 1/2017 | Grossgebauer | F16F 15/1421 |
| 9,599,188 B2* | 3/2017 | Dogel | F16F 15/1202 |
| 9,964,176 B2* | 5/2018 | Dogel | F16F 15/1428 |
| 2010/0236228 A1* | 9/2010 | Degler | F16F 15/145 |
| | | | 60/338 |
| 2015/0122605 A1* | 5/2015 | Grossgebauer | F16F 15/1421 |
| | | | 192/3.21 |
| 2015/0316123 A1* | 11/2015 | Dogel | F16H 45/02 |
| | | | 74/572.2 |
| 2015/0362042 A1* | 12/2015 | Orlamunder | F16F 15/123 |
| | | | 123/192.1 |
| 2016/0169321 A1* | 6/2016 | Dogel | F16F 15/1421 |
| | | | 74/574.2 |
| 2016/0186835 A1* | 6/2016 | Dogel | F16F 15/1202 |
| | | | 74/574.2 |

FOREIGN PATENT DOCUMENTS

| | | |
|---|---|---|
| DE | 10 2012 218921 | 4/2014 |
| DE | 10 2012 218924 | 4/2014 |
| DE | 10 2014 001 043 | 8/2014 |
| DE | 10 2013 210 637 | 12/2014 |

* cited by examiner

TORSIONAL VIBRATING DAMPING ASSEMBLY, IN PARTICULAR MASS DAMPER UNIT

CROSS REFERENCE TO RELATED APPLICATIONS

This is a U.S. national stage of application No. PCT/EP2015/067942, filed on Aug. 4, 2015. Priority is claimed on German Application No. DE102014011952.1, filed Aug. 14, 2014, the content of which is incorporated here by reference.

BACKGROUND OF THE INVENTION

1. Field of the Invention

The present invention is directed to a torsional vibration damping arrangement, in particular mass damper subassembly, comprising a carrier that can be driven in rotation and a damper mass that is rotatably deflectable with respect to the carrier against the restoring action of a damper spring, wherein the damper spring is fixedly clamped in the damper mass and is supported or supportable with respect to the carrier for transmitting circumferential force.

2. Description of the Prior Art

In a torsional vibration damping arrangement of this type that can be integrated, for example, in the powertrain of a vehicle, a damper mass, which is annularly constructed, for example, and arranged so as to surround the carrier, which is rotatable around an axis of rotation, can carry out a substantially free oscillation against the restoring action of one or more damper springs which are constructed, for example, as leaf springs. By varying the radial positioning of the supporting region of the damper springs with respect to the carrier such that, for example, with increasing speed the area of radial support is displaced radially outward with respect to the carrier, a speed-adaptive damping behavior or absorptive behavior can be achieved.

SUMMARY OF THE INVENTION

It is an object of one aspect of the present invention to configure a torsional vibration damping arrangement in such a way that a stable connection of a damper spring to the damper mass is achieved in a simple construction.

According to one aspect of the invention, a torsional vibration damping arrangement, in particular mass damper subassembly, includes a carrier, which can be driven in rotation, and a damper mass, which is rotatably deflectable with respect to the carrier against the restoring action of a substantially radially extending damper spring, wherein the damper spring is fixedly clamped in the damper mass and is supported or supportable with respect to the carrier for transmitting circumferential force It is further provided that the damper spring is clamped between clamping elements arranged at both sides of the damper spring in circumferential direction.

As a result of the defined clamping of the damper springs with respect to the damper mass at both circumferential sides of the damper spring, a defined positioning of the damper spring with respect to the damper mass and accordingly also a defined circumferential force supporting interaction are achieved.

A configuration in which it is provided that at least one clamping element arranged at one circumferential side of the damper spring is harder than at least one clamping element arranged at the other circumferential side of the damper spring is particularly advantageous. By configuring a clamping element to be harder it is ensured that the defined position specification for the damper spring is retained even under greater load.

In order to ensure the defined position specification for the damper spring in a simple construction, it is further proposed that the at least one harder clamping element is constructed with metal material and is hardened at least in its region cooperating with the damper spring. In order to achieve a clamping without play it can further preferably be provided that at least one softer clamping element is constructed with metal material and is not hardened at least in its region cooperating with the damper spring. Accordingly, while a clamping element, which is constructed at least with partially hardened metal material provides for a defined position specification owing to its reduced deformability, a clamping element that is not hardened or that is not hardened at least in its area cooperating with the damper spring can ensure play-free clamping with respect to the other clamping element, i.e., the harder clamping element, owing to the easier deformability of the clamping element that is not hardened.

In a configuration which is particularly advantageous for a stable clamping, it is suggested that the damper spring is clamped between clamping elements located opposite one another in pairs in circumferential direction and that one of the clamping elements of a pair of clamping elements is a harder clamping element and the other clamping element of the pair of clamping elements is a softer clamping element, and two pairs of clamping elements are preferably provided radially successively, and, further, the harder clamping element of the radially outer pair of clamping elements and the softer clamping element of the radially inner pair of clamping elements are preferably provided at a circumferential side of the damper spring.

In order to provide an abutment at both sides of a damper spring, which abutment predetermines a defined positioning, it is suggested that at least one harder clamping element is provided at each circumferential side of the damper spring, and harder clamping elements that are preferably arranged at different circumferential sides of the damper spring are arranged so as to be radially offset relative to one another.

To ensure the speed adaptation of the mass damping characteristic, it is suggested that a circumferential force can be transmitted by the damper spring between the carrier and the damper mass in only one circumferential direction.

In this respect, it is advantageously provided that at least one, preferably every, clamping element loaded by transmission of a circumferential force through the damper spring is a harder clamping element. Clamping elements that are not loaded or that are not highly loaded during transmission of a circumferential force through the damper spring can be constructed as softer clamping elements to provide the stable clamping.

The damper spring is preferably constructed as a leaf spring to provide high loadability. Further, it is suggested particularly for a force transmission interaction between the carrier and the damper mass, which is homogeneous in circumferential direction, that a plurality of damper springs is provided successively in circumferential direction, and a portion of the damper springs is preferably formed in a first circumferential direction for transmitting a circumferential force between the carrier and the damper mass, and a portion of the damper springs is preferably formed in a second circumferential direction opposite the first circumferential direction for transmitting a circumferential force between the carrier and the damper mass.

In an embodiment form that is particularly advantageous with respect to construction and can be realized in a simple manner, the damper mass can comprise a clamping ring with a first clamping ring half and a second clamping ring half located opposite the latter, wherein the clamping ring halves are connected to one another through spacer pieces, wherein preferably at least one, preferably every, spacer piece provides a clamping element, wherein further preferably at least the spacer pieces that provide a softer clamping element are formed as rivet bolts. The total number of component parts can be limited in particular through the use of spacer pieces as clamping elements.

When the spacer pieces, or at least some of the spacer pieces, are used as clamping elements, it is particularly advantageous in case the clamping ring halves are connected by the spacer pieces providing clamping elements when the spacer pieces providing a softer clamping element in each instance are plastically deformed for play-free clamping of damper springs. As a result of the plastic deformation of softer clamping elements, a shaping or bulging thereof is achieved in direction of a respective damper spring to be clamped by the latter so that this damper spring is then pressed against a harder clamping element and can accordingly be clamped without play.

In a further advantageous embodiment form, it can be provided that the carrier comprises a control disk, wherein a sliding block is arranged at the control disk so as to be associated with the damper spring such that it is displaceable radially outward against the force of a sensor spring for circumferential force support of the damper spring with respect to the control disk, and the control disk preferably comprises a first control disk half and a second control disk half, which is connected to the first control disk half.

The damper spring advantageously extends substantially in radial direction. In this way, a direct connection is produced without deflection.

The invention is further directed to a hydrodynamic torque converter comprising an impeller, i.e., an impeller wheel, at a housing, a turbine, i.e., a turbine wheel, in the housing, a stator, a lockup clutch and a vibration-reducing system, i.e., a torsional vibration damper, connecting the lockup clutch to a hub, and further comprising a torsional vibration damping arrangement according to the invention.

In this respect, it can be provided that the turbine wheel is coupled with the hub via the torsional vibration damping arrangement.

The torsional vibration damping arrangement can be coupled with the hub via the vibration-reducing system or can be coupled downstream of the vibration-reducing system, i.e., directly, with the hub or a transmission input shaft.

BRIEF DESCRIPTION OF THE DRAWINGS

The present invention will be described in more detail in the following with reference to the accompanying drawings. In the drawings.

DETAILED DESCRIPTION OF THE PRESENTLY PREFERRED EMBODIMENTS

Figure 1:
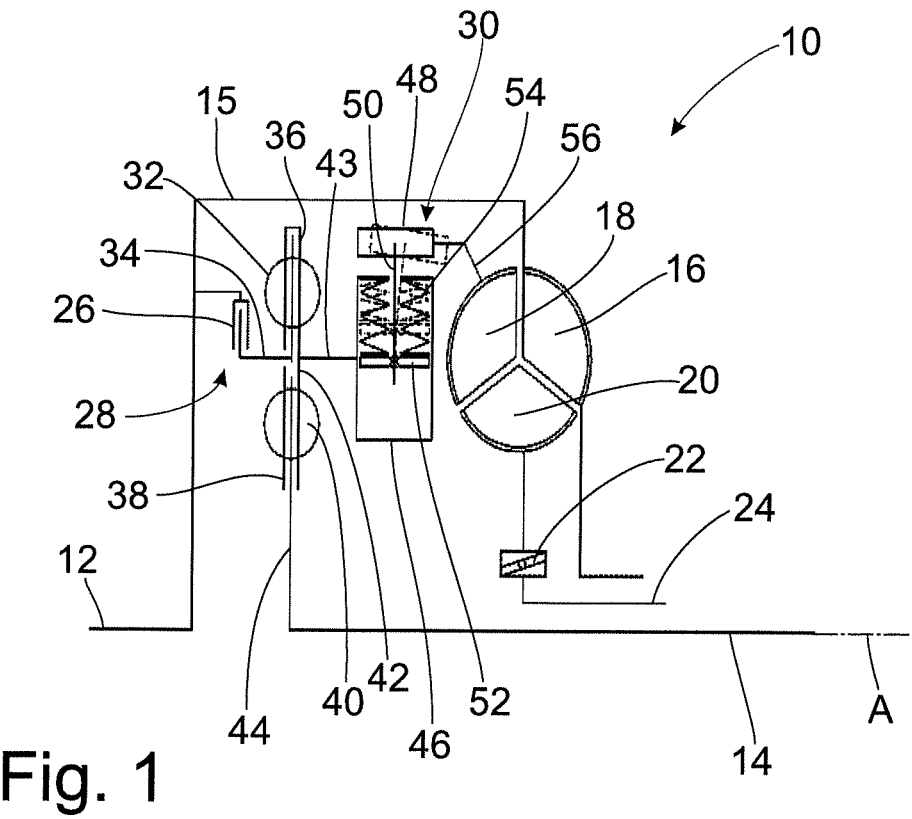
FIG. 1 is a schematic fragmentary longitudinal section through a hydrodynamic torque converter.

FIG. 1 is a schematic view of a hydrodynamic torque converter 10. A driveshaft, for example, a crankshaft 12 of an internal combustion engine, is coupled with an output shaft, for example, a transmission input shaft 14, through the torque converter 10. The crankshaft 12 and the transmission input shaft 14 are rotatable around a common rotational axis A. The torque converter 10 comprises an impeller wheel 16 provided at a housing 15 thereof and a turbine wheel 18 arranged in the interior of the housing 15. Located between the impeller wheel 16 and the turbine wheel 18 in the radially inner region is a stator 20, which is supported via a freewheel 22 on a supporting shaft 24 so as to be rotatable in one direction around the rotational axis A.

The turbine wheel 18 is coupled to the housing of the torque converter in lockup condition via a lockup clutch, designated generally by 26, and a torsional vibration damper 28 and a torsional vibration damping arrangement 30, which will be described in more detail in the following. Further, the turbine wheel 18 is coupled or can be coupled to the transmission input shaft 14 via the torsional vibration damping arrangement 30 and the torsional vibration damper 28.

It should be mentioned here that the torsional vibration damper 28 can comprise a radially outer vibration damper 32 whose primary side 34 is coupled to the lockup clutch 26 and whose secondary side 36, together with a primary side 38 of a second vibration damper 40 situated farther radially inside, provides an intermediate element 42 to which the torsional vibration damping arrangement 30 and, via the latter, the turbine wheel 18 are also coupled via a connection 43. A secondary side 44 of the radially inner vibration damper 40 is coupled or can be coupled to the transmission input shaft 14 via a hub or the like, for example. Each of the vibration dampers 32, 40 comprises a spring set between the respective primary side 26 and 38 and the respective secondary side 36 and 44, and the primary sides and secondary sides are rotatable with respect to one another around the rotational axis A against the restoring action of the spring set.

The torsional vibration damping arrangement 30 shown schematically in FIG. 1 comprises a carrier 46, which in the embodiment example in FIG. 1, is coupled to the intermediate element 42 and is annular, for example, and is enclosed radially outwardly by a deflection mass or damper mass 48, which is preferably likewise annular. The damper mass 48 is coupled to the carrier 46 so as to be deflectable in circumferential direction around the rotational axis A with respect to the carrier 46 by a plurality of damper springs 50, which are arranged successively in circumferential direction around the rotational axis A, and are preferably constructed as leaf springs. The substantially radially arranged leaf springs or damper springs 50, i.e., the substantially radially extending damper springs 50, are fixedly connected by clamping to the damper mass 48 in their radially outer end region. In a region located farther radially inward, the damper springs 50 are supported or supportable in circumferential direction for force transmission with respect to the carrier 46 via sliding blocks or sliding elements 52, which are supported at the carrier 46 in each instance so as to be radially displaceable. The sliding elements 52 are preloaded radially inward against the restoring action or the force of a respective sensor spring 54, e.g., helical spring, and are moveable radially outward under the influence of centrifugal force.

Since the turbine wheel 18 in the present embodiment form is connected to the damper mass 48 by a connection 56 comprising one or more connection elements, it contributes to the total mass of the damper mass 48 and accordingly codetermines the vibration behavior of the torsional vibration damping arrangement. Further, the vibration behavior of the torsional vibration damping arrangement is determined by the sliding elements 52 which are displaceable radially outward by centrifugal force because the region in which the damper springs 50 are supported or supportable with respect to the carrier 46 rotating around the rotational axis A is also radially displaced during radial displacement of the sliding elements 52 so that the effective spring length and, therefore, also the stiffness of the damper springs 50, varies depending upon speed. Accordingly, it is possible to configure the mass damper subassembly or torsional vibration damping arrangement 30 to be speed-adaptive, i.e., to adapt it to an excitation order, which varies with speed, for example.

Figure 2:
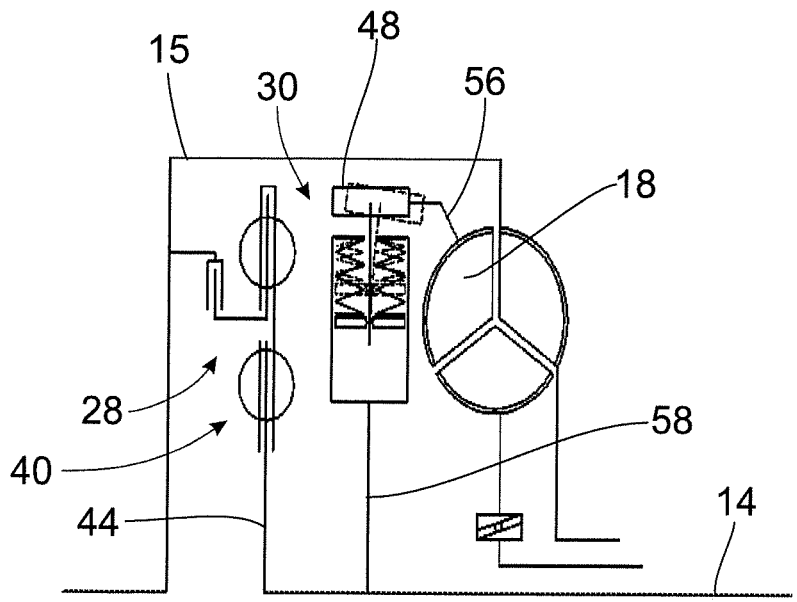
FIG. 2 is a view of an alternative configuration type corresponding to FIG. 1.

In the embodiment form shown in FIG. 2, the torsional vibration damping arrangement 30 is not coupled to the intermediate element 42 of the torsional vibration damper 28, but rather directly to the transmission input shaft 14 or to the secondary side 44 of the radially inner vibration damper 40, for example, via a connection 58.

Figure 3:
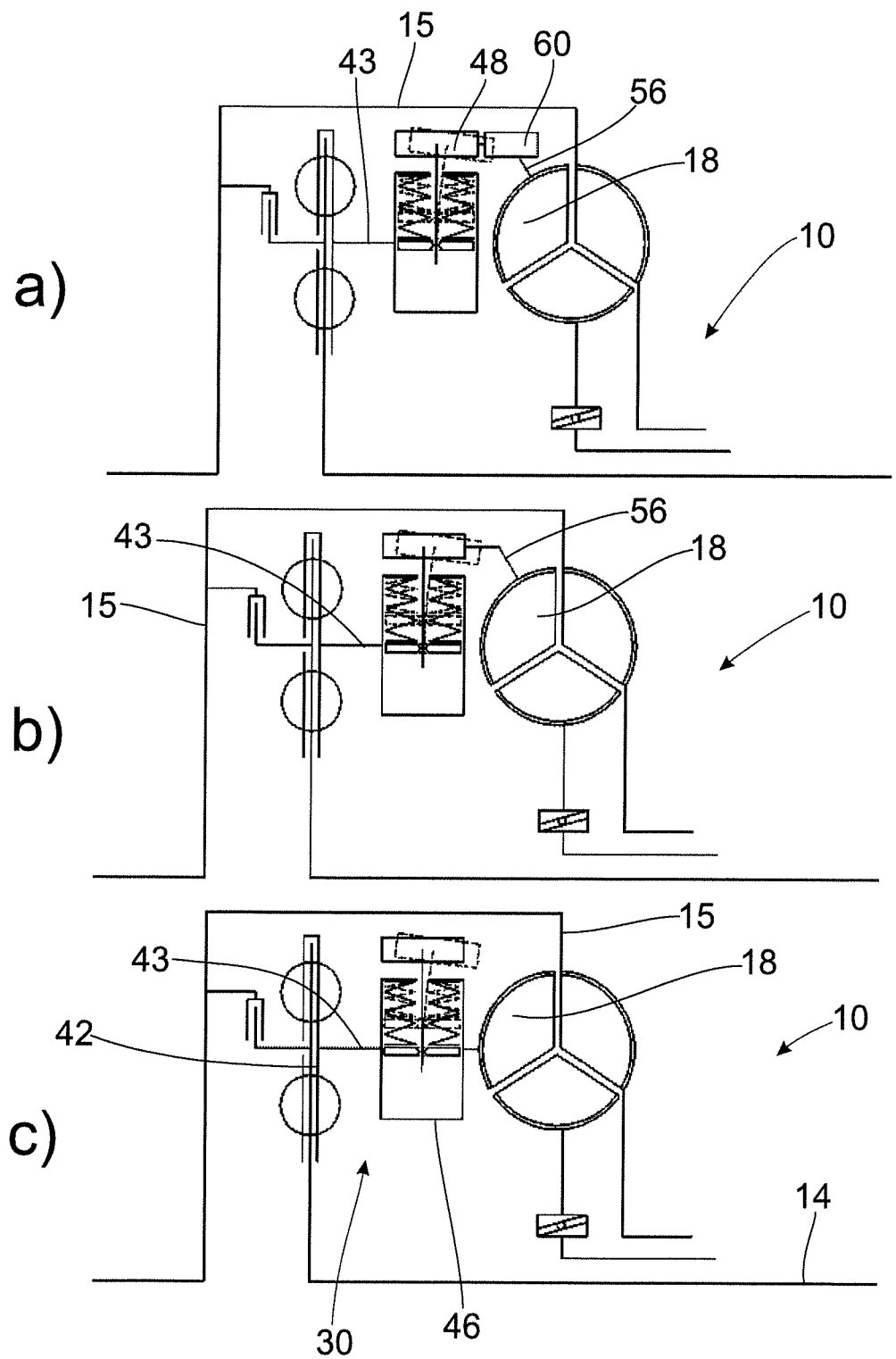
FIGS. 3*a,b,c* are views of alternative configuration types corresponding to FIG. 1.

In the embodiment form shown in FIG. 3a), an additional mass 60 is coupled together with the turbine wheel 18 to the damper mass 48, for example, via connection 56 so that a further increased damper mass can be provided. This configuration is suitable particularly when used in connection with three-cylinder engines in which the main excitation order is the 1.5th engine order.

The embodiment form of a hydrodynamic torque converter shown in FIG. 3b) corresponds substantially to the embodiment form according to FIG. 1 and is designed particularly for use in four-cylinder engines and configured to the second engine order as main excitation order.

FIG. 3c) shows an embodiment form in which the turbine wheel 18 is coupled to the carrier 46 of the torsional vibration damping arrangement 30 and accordingly does not contribute to the increase in the mass of the damper mass 48 but rather to the increase in the mass of the intermediate element 42. This configuration is particularly suitable for six-cylinder engines in which the third engine order is considered as main excitation order.

By varying the connection of the turbine wheel 18 to the torsional vibration damping arrangement 30 or by varying the connection of the torsional vibration damping arrangement 30 to other system areas of the torque converter 10, a variability in the mass moment of inertia of different system areas is achieved so that an adaptation to different drive systems can be achieved without requiring structural modification of the torsional vibration damping arrangement 30 per se, particularly of the damper springs 50 thereof or of the sensor springs 54 thereof. However, it is advantageous that the turbine wheel 18 is connected to the damper mass 48 by principle and a variability in tuning is achieved through a variation in the region of the damper springs, for example, so that a standardized installation process can be used.

Figure 4:
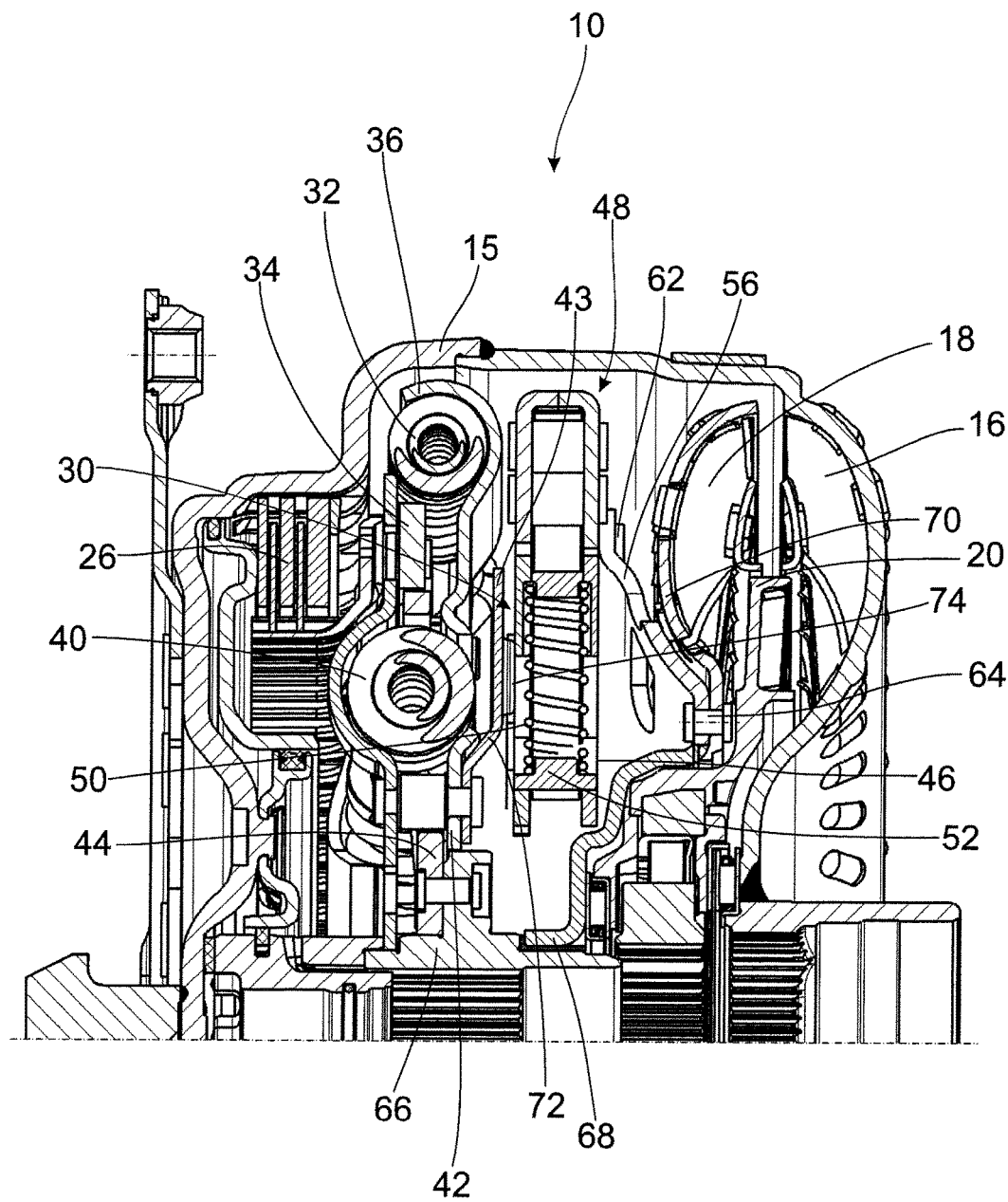
FIG. 4 is a fragmentary longitudinal section through a hydrodynamic torque converter with a vibration damping arrangement.

FIG. 4 shows a fragmentary longitudinal section through a hydrodynamic torque converter 10 with the torsional vibration damping arrangement 30 in constructional layout. The constructional aspects described already above referring to the schematic views in FIGS. 1 to 3 will be seen in FIG. 4. It can be seen in particular that a turbine wheel shell 70 is connected to the damper mass 48 via the connection 56, which is formed as a shaped sheet metal part, for example, by rivet bolts 62. Proceeding radially inward via the joint of connection 56 to turbine wheel shell 70 by rivet bolt 64, the connection 56 extends toward a hub 66 or is supported in axial direction and radial direction with respect to the hub 66 by a radially inner bearing projection 68. The bearing support can be carried out via a sliding bearing, which is always well lubricated because the converter housing is filled with oil. The radial bearing support is particularly important for preventing the occurrence of imbalances because a radially fixed coupling between the damper mass 48 and the carrier 46 via the damper springs 50 is not implemented. The axial bearing support is important particularly for compensating the turbine push and turbine pull occurring during torque converting operation.

The carrier 46 of the torsional vibration damping arrangement 30 is coupled to the intermediate element 42 of the torsional vibration damper via the connection designated generally by 43. The connection 43 can comprise, for example, a connection plate 72, which is fixedly connected to the carrier 46 of the torsional vibration damping arrangement 30, for example, through a rivet joint 74.

Figure 5:
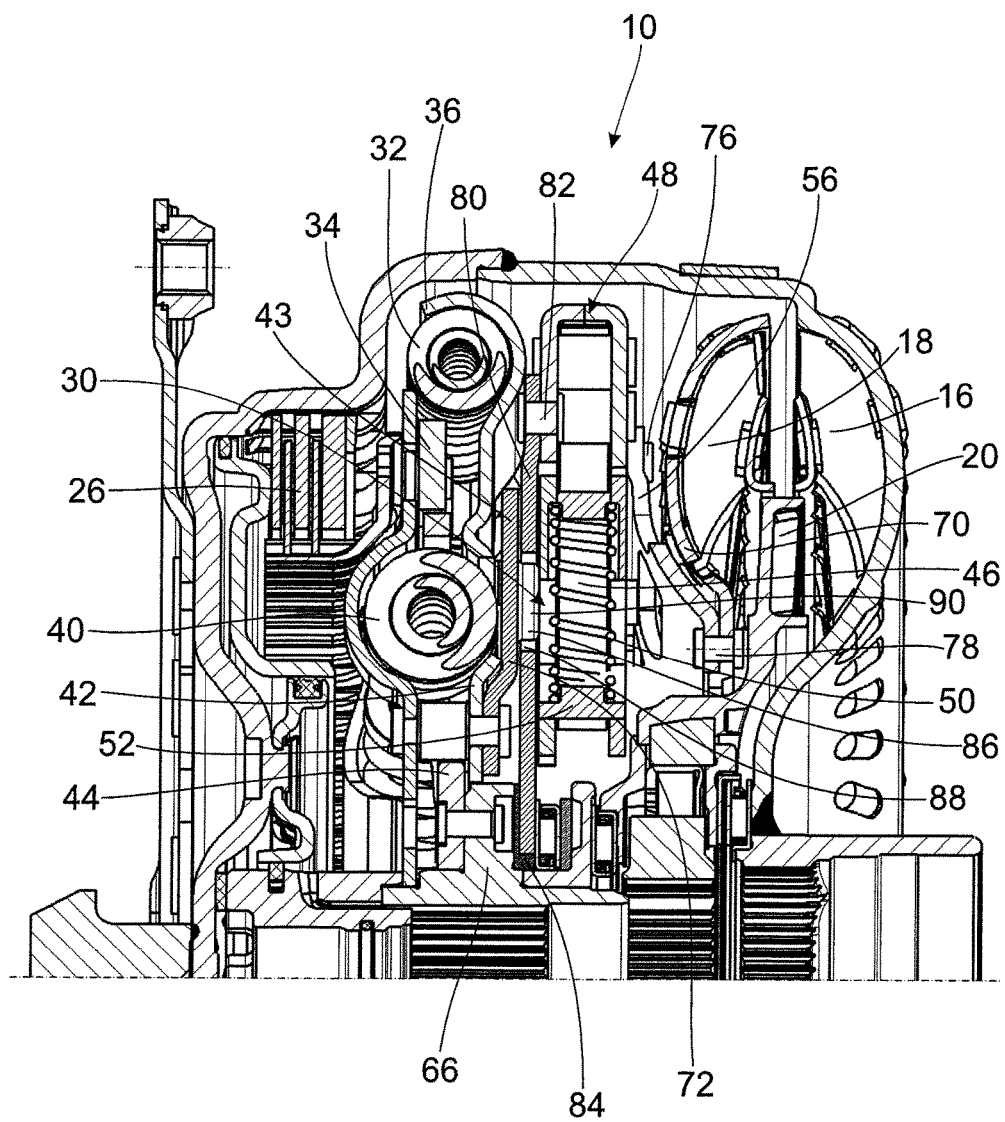
FIG. 5 is a view of an alternative embodiment form corresponding to FIG. 4.
Figure 6:
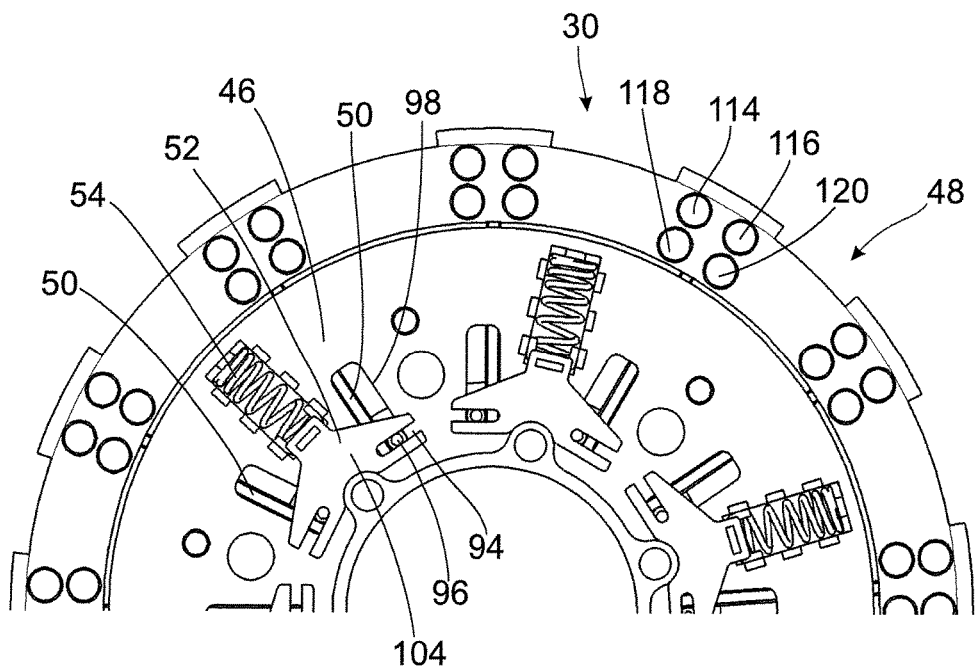
FIG. 6 is a partial axial view of a torsional vibration damping arrangement.
Figure 7:
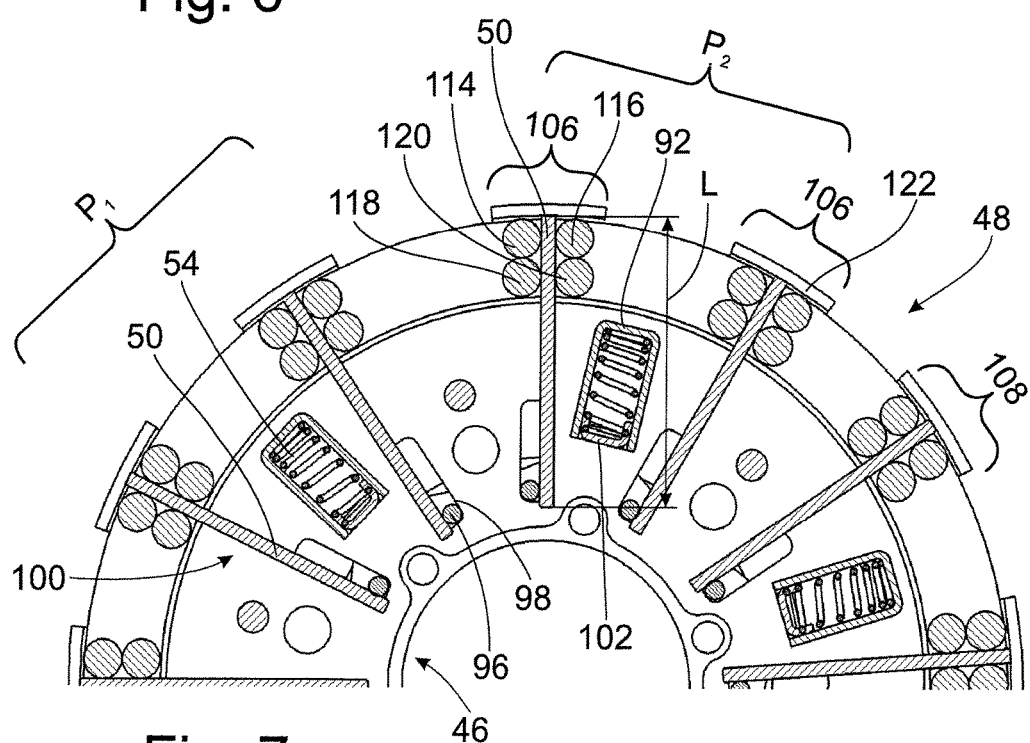
FIG. 7 is a partial cross-sectional view through the torsional vibration damping arrangement of FIG. 6.
Figure 8:
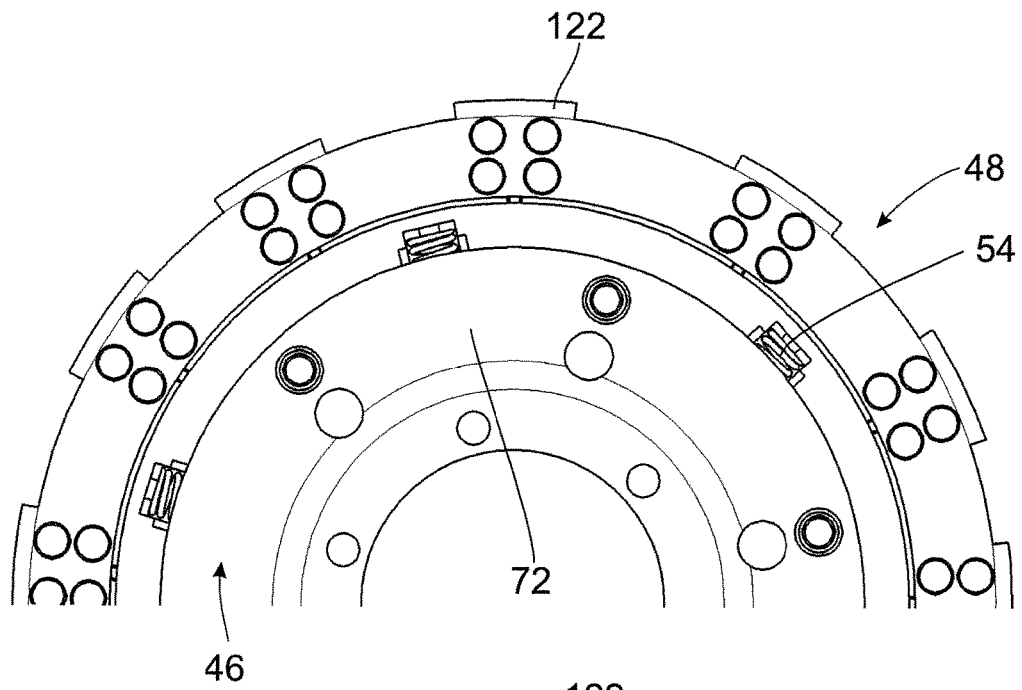
FIG. 8 is an axial view of the torsional vibration damping arrangement of FIG. 6 viewed in another axial direction.

FIG. 5 shows a modification of the torque converter 10 in which the turbine wheel 18 is coupled to the intermediate element 42 via the carrier 46. To this end, the connection 56 can be fixedly connected to the carrier 46 via rivet bolts 76. Farther radially inward, the connection 56 is fixedly connected to the turbine wheel shell 70 through rivet bolts 78.

The carrier 46 of the torsional vibration damping arrangement 30 is connected to the intermediate element 42 of the torsional vibration damper by connection 43. The radial centering of the damper mass 48 is carried out via a centering plate or carrier plate 80, which is fixedly connected to the damper mass 48 radially outwardly through rivet bolts 82 and is radially supported radially inwardly via a bearing 84, for example, with respect to the hub 66.

The carrier 46 is connected via the connection plate 72 to the intermediate element 42, for example, by riveting. In order to be able to couple the connection plate 72 to the carrier 46 of the torsional vibration damping arrangement 30, for example, through rivet bolts 86, the carrier plate 80 has openings 88 through which rivet bolts 90 extend with circumferential movement play, the connection plate 72 being connected to the carrier 46 through these rivet bolts 90.

A first constructional variant of the mass damper subassembly or torsional vibration damping arrangement 30 will be described in the following referring to FIGS. 6 to 9.

A sliding element 52 is radially movably guided at the carrier 46, also referred to generally as control disk, so as to be associated in each instance with two damper springs 50 arranged successively in circumferential direction. The sliding element 52 is supported at the radially inner end area of a sensor spring 54, which is constructed, for example, as a helical compression spring and which is supported in its radially outer end area in turn at a sensor spring support 92 which, for example, also provides guide surfaces for a respective sliding element 52. Every sliding element 52 can comprise an internal element 102 supported at the radially inner region of a respective sensor spring 54 and an external element 104 respectively at both axial sides of the carrier 46, which is fixedly coupled in each instance to the internal element 102, for example, by a spline. Associated with each of the two damper springs 50 located next to one another in circumferential direction, the sliding element 52 has guide slots or tangential guides 94, which extend substantially in circumferential direction and open in direction away from one another. Control pins 96 are guided into these guide slots or tangential guides 94 so as to be moveable in tangential direction or substantially in circumferential direction. Further, the control pins 96 are radially guided in guide contours 98, i.e., for example, guide slots, that extend substantially radially in the carrier 46, i.e., are oriented substantially parallel to the extension direction of the damper springs 50. Accordingly, during radial displacement of a respective sliding element 52, the control pins 96, which are likewise radially guided, can be displaced in circumferential direction with respect to the sliding element 52 cooperating with these control pins 96, which affords the possibility of adapting the circumferential distance of the two control pins 96 cooperating with a sliding element 52 to the circumferential spacing of the damper springs 50 cooperating with the same sliding element 52, the magnitude of which circumferential spacing varies in different radial areas. This is required particularly because the two damper springs 50 are arranged so as to extend substantially radially and not parallel to one another.

Together with the sensor spring 54, which preloads it radially inward, and with the control pins 96 for the two damper springs 50, which also cooperate with it, a respective sliding element 52 forms an adjusting device 100. The circumferential force to be transmitted from the damper springs 50 to the carrier 46 is transmitted to the carrier 46 through the control pins 96, which are moved radially by the sliding element 52. It can be seen from FIG. 7 that only one circumferential support of the two damper springs 50 cooperating with a sliding element 52 is provided in a circumferential direction so that a loading of the control pins 96 occurs only during a half-wave of an oscillation and the control pins 96 are substantially not loaded during the other half-wave, so that an adjustability of the sliding element 52 is ensured in radial direction particularly during a change in the speed and accordingly also in centrifugal force.

In order nevertheless to transmit forces between the carrier 46 and the damper mass 48 in both circumferential directions, pairs $P_1$ and $P_2$ of damper springs 50, which are formed for circumferential support with respect to the carrier 46 in opposite directions, are provided successively. Accordingly, for example, each pair $P_2$ comprises two pull-side damper spring units 106, while each pair $P_1$ can comprise two push-side damper spring units 108.

As a result of the radial displacement of the respective sliding element 52, the total length L of a respective damper spring 50 available for bending varies. The farther the sliding element 52 is positioned radially inward, the greater the free length available for deformation and bending and the softer or less stiff the respective damper spring 50.

Figure 9:
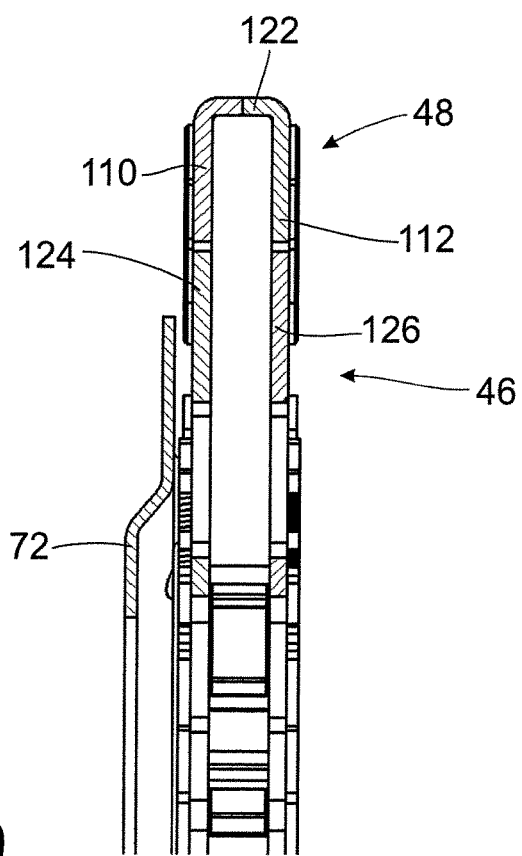
FIG. 9 is a fragmentary longitudinal section through the torsional vibration damping arrangement of FIG. 8.
Figure 10:
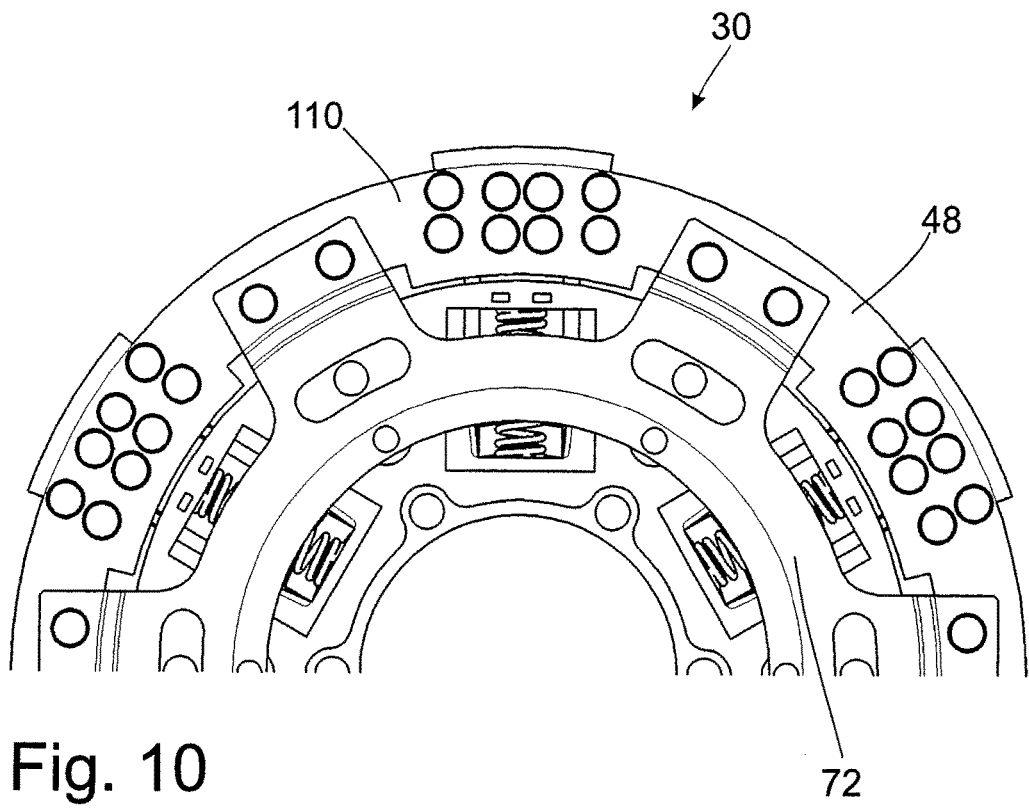
FIG. 10 is a view of an alternative configuration type of the torsional vibration damping arrangement corresponding to FIG. 6.
Figure 11:
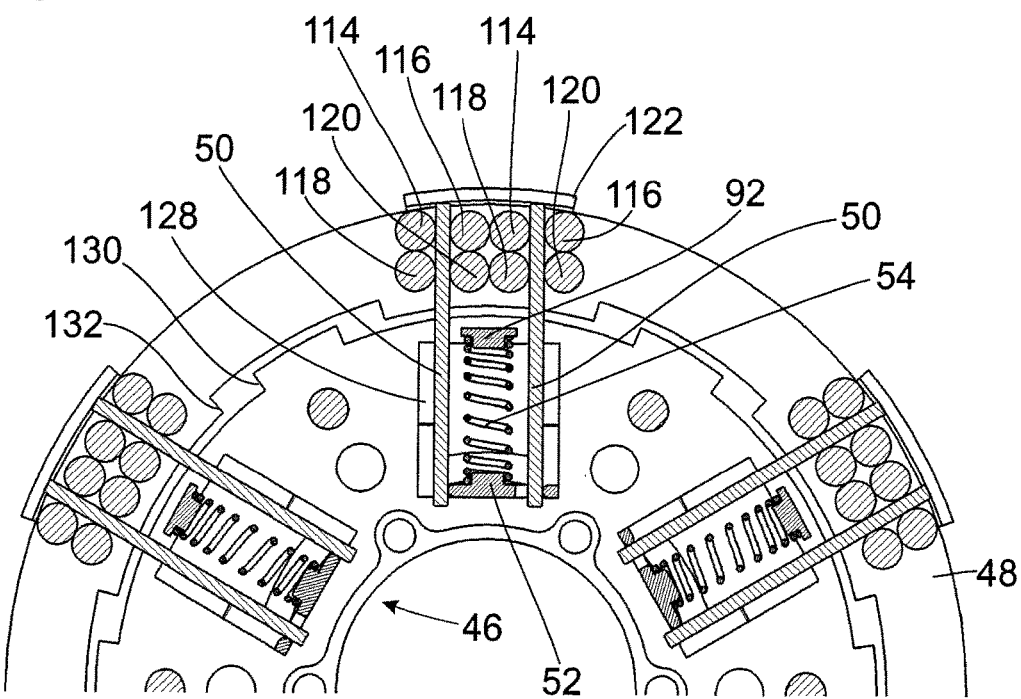
FIG. 11 is a partial cross-sectional view through the torsional vibration damping arrangement of FIG. 10.
Figure 12:
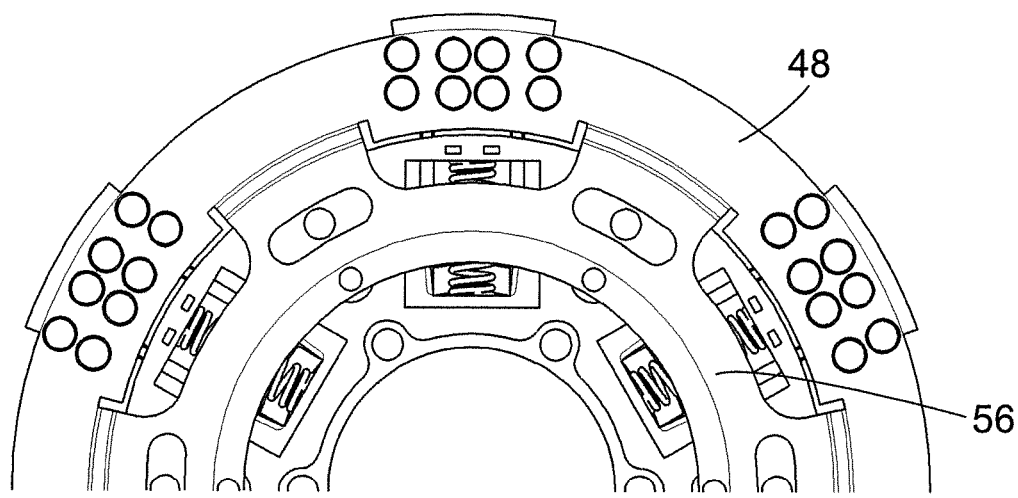
FIG. 12 is a view of the torsional vibration damping arrangement corresponding to FIG. 10 seen in another axial direction.
Figure 13:
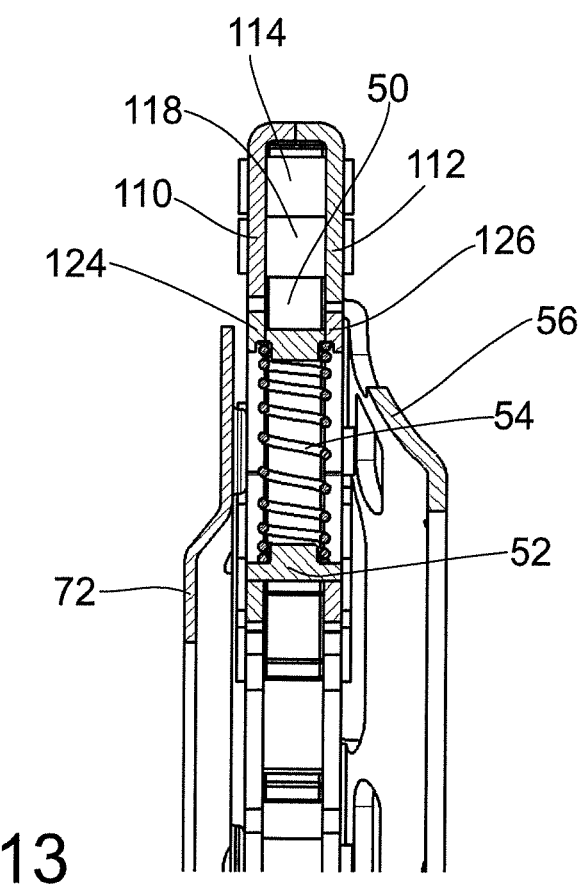
FIG. 13 is a fragmentary longitudinal section through the torsional vibration damping arrangement of FIGS. 10 to 12.

FIG. 9 shows that the damper mass 48 which is generally provided as clamping ring is formed with two clamping ring halves 110, 112. The two clamping ring halves 110, 112 are connected to one another by groups of four spacer pieces 114, 116, 118, 120 constructed as spacer bolts, which groups are also provided so as to be associated with the individual damper springs 50. The two clamping ring halves 110, 112 are advantageously formed as shaped sheet metal parts by stamping from a sheet metal blank and bending into a contour that is substantially L-shaped in section. Radially outer tabs 122 are formed at which the damper springs 50 can also be supported radially outwardly and accordingly can also be held in a radially defined position.

The spacer pieces 114, 116, 118, 120 constructed as rivet bolts are located opposite one another in pairs in circumferential direction on both sides of a respective damper spring 50; that is, the two spacer pieces 114, 116 form a pair and the two spacer pieces 118, 120 form a pair. A damper spring 50 is fixedly clamped between these spacer pieces 114, 116 and 118, 120, respectively, which form a pair in each instance and is accordingly held by clamping.

Owing to the fact that the damper springs 50 are configured to transmit a force between the damper mass 48 and the carrier 46 in only one circumferential direction, an unequal loading of the spacer pieces 114, 116, 118, 120 of a respective pair occurs in operation during transmission of force. When considering damper springs 50 of pair $P_2$ in FIG. 7, for example, it will be seen that owing to the fact that a force is transmitted via the damper springs 50 only during rotation of the damper mass 48 in counterclockwise direction with respect to the carrier 46, these damper springs 50 are deformed by this force. The damper springs 50 are supported at the two diagonally opposite spacer pieces 114, 120 or are more extensively supported at the latter during introduction of force, whereas a loading of the spacer pieces 116, 118 which increases during introduction of force does not actually occur. In order to prevent an excessive loading of or an excessive wear of the spacer pieces 114, 120 which are loaded more extensively by force transmission, these spacer pieces 114, 120 are preferably hardened, i.e., comprise hardened metal material. For example, it can be provided that only that area, i.e., particularly length area, thereof in which they cooperate with a damper spring 50 for support thereof is hardened, which is substantially the portion located between the two clamping ring halves, 110, 112. The end portions of these spacer pieces 114, 120 to be guided through a respective opening in the clamping ring halves 110, 112 are not hardened, for example, so as to ensure their deformability for producing a rivet connection.

The two other spacer pieces 116, 118, which are not more heavily loaded by transmission of force, are preferably formed of metal material that is not hardened so that they are basically more easily deformable and in particular also during deformation for producing the rivet connection are deformed to the extent that they press the damper springs 50 against the other respective spacer piece 114, 120 of a respective pair. This means that a defined positioning is also predetermined for the damper springs 50 as a result of the harder spacer pieces 114, 120, while as a result of the more easily deformable, softer spacer pieces 116, 118 the pressing force required for clamping the damper springs 50, or every damper spring 50, between the different spacer pieces occurs during the plastic deformation of these spacer pieces. Accordingly, a play-free clamping of the damper springs 50 is achieved between the spacer pieces 114, 116, 118, 120 arranged in circumferential direction on both sides thereof. Accordingly, within the meaning of the present invention, the spacer pieces 114, 116, 118, 120 form clamping elements of which the spacer pieces or clamping elements 114, 120 that are more heavily loaded by force transmission between the damper mass 48 and the carrier 46 are formed so as to be harder, or at least locally harder, than spacer pieces 116, 118, while spacer pieces or clamping element 116, 118 are constructed so as to be softer than spacer pieces 114, 120 to achieve the plastic deformation thereof also in the area located between the two clamping ring halves 110, 112.

FIG. 9 further shows that the carrier 46 can also be formed with two halves, i.e., control disk halves 124, 126. They can likewise be fixedly connected to one another by rivet bolts or spacer bolts, for example, and shaped from sheet metal material. For example, a clamping ring half and a control disk half can be cut out from the same sheet metal blank by punching or the like, for example.

FIGS. 10 to 13 show a torsional vibration damping arrangement 30, which differs from the embodiment form described above primarily in that the two damper springs 50 that are associated with one another in pairs and are located directly adjacent to one another are arranged substantially parallel to one another and accordingly not exactly radially aligned. This allows a simple construction of the sliding element 52, since it is not necessary to adapt to different circumferential spacing between the damper springs 50 in different radial areas. The sliding element 52 is radially movably guided in a respective window 128 of the control disk halves 124 and 126, respectively. In order to predetermine a defined positioning for a respective sensor spring 54, centering projections which engage in the sensor spring 54 can be provided at the sliding element 52 on the one hand and/or at a respective sensor spring support 92.

In order to provide a deflection limit for the circumferential movement of the damper mass 48 with respect to the carrier 46, stops 130, 132 engaging radially and/or axially one inside the other can be provided at the carrier 46 and damper mass 48 with circumferential movement play.

Figure 14:
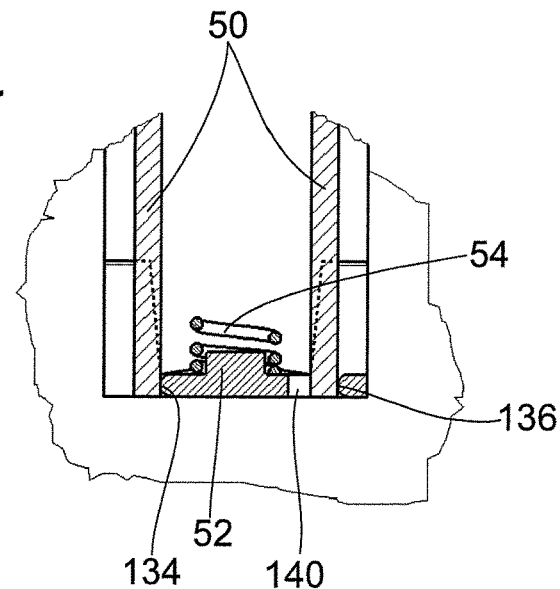
FIG. 14 is a detail of the torsional vibration damping arrangement in section showing the support of a sensor spring.

FIG. 14 shows in detail how the two damper springs 50 which are associated with one another in pairs cooperate in this type of configuration with the sliding element 52 for circumferential support. For both damper springs 50, the sliding element 52 has respective circumferential supporting areas 134, 136 which enable a supporting of the two damper springs 50 in the same circumferential direction with respect to sliding element 52, while substantially no supporting interaction is provided in the other circumferential direction.

Figure 15:
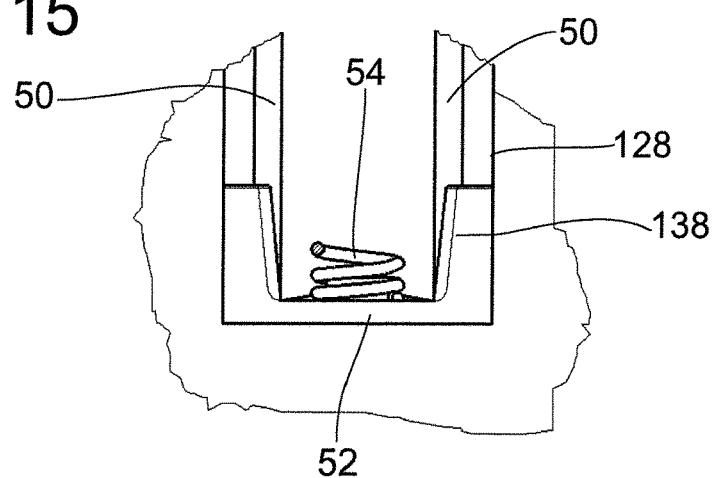
FIG. 15 is the detail from FIG. 14 in a side view.
Figure 16:
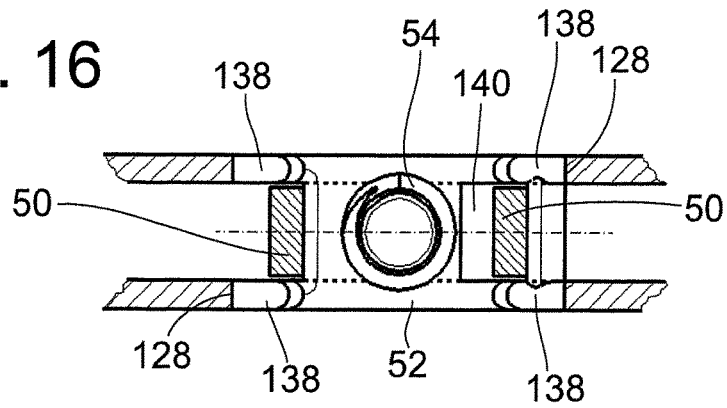
FIG. 16 is a sectional view—seen radially—of the detail from FIGS. 14 and 15.

FIGS. 15 and 16 show that the sliding element 52 is supported in circumferential direction with respect to the clamping ring halves 110, 112 and accordingly with respect to the carrier 46 by respective tangential guides or circumferential guides engaging in the window 128 of the clamping ring halves 110, 112 and are accordingly guided in radial direction. FIG. 16 clearly also shows a cutout 140 of the sliding element 52 in which the damper spring 50, seen on the right-hand side in FIG. 14, engages in order to release the cutout 140 in one circumferential direction.

Figure 17:
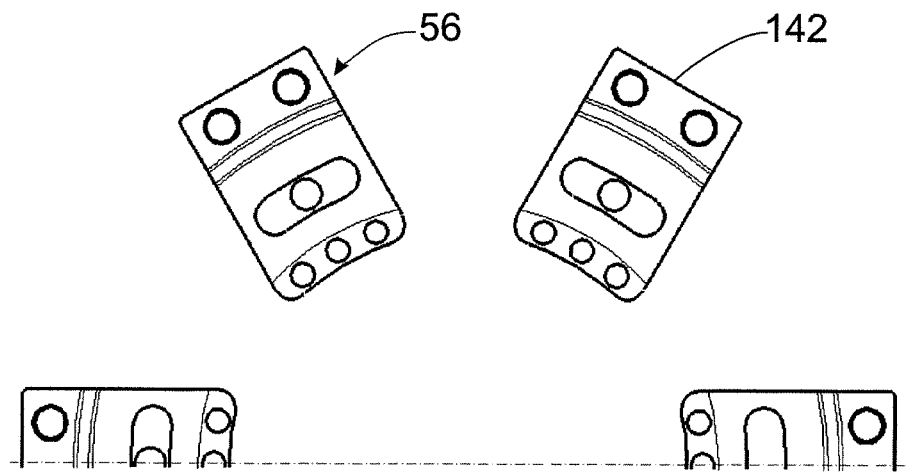
FIG. 17 is a configuration making use of the connection through individual elements.

FIG. 17 shows a configuration of connection 56 by which, for example, the turbine wheel 18 can be connected to the damper mass 48. The connection 56 comprises a plurality of individual connection elements 142 that can be connected by riveting to the turbine wheel 18, in particular the turbine wheel shell 70 thereof, on the one hand and, for example, one of the clamping ring halves on the other hand. Correspondingly, a connection could also be carried out with respect to the intermediate element 42 of the torsional vibration damper 28. It will be seen that a larger quantity of rivet connections is provided particularly in the radially inner area than in the radially outer area to ensure adequate fixation. An interference pin or the like can also be used in one of these openings which are provided for riveting.

Figure 18:
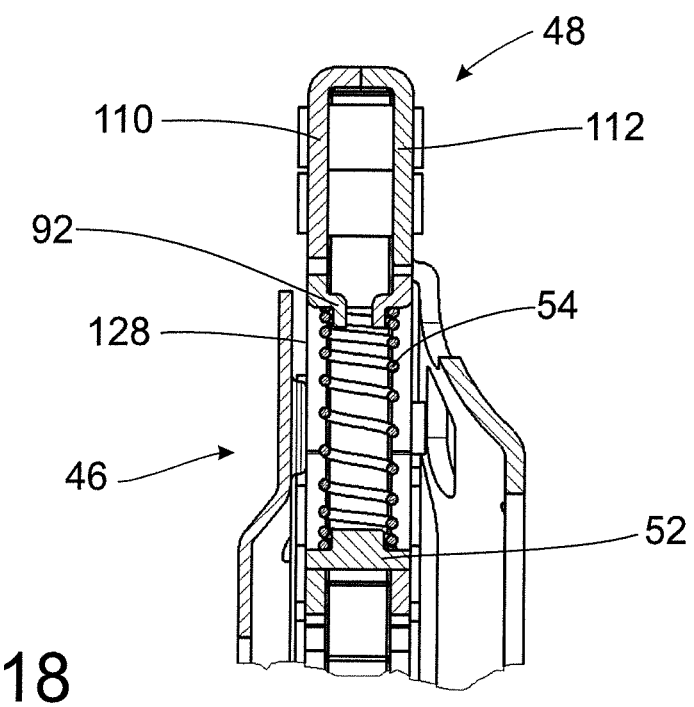
FIG. 18 is a fragmentary longitudinal section through a modification of the torsional vibration damping arrangement.

FIG. 18 shows that the sensor spring support 92 for a sensor spring 54 can be realized in the radially outer area thereof, for example, by forming integrally at the carrier 46. For example, the two control disk halves 124, 126 can have inwardly directed shapes in the areas providing the windows 128.

Figure 19:
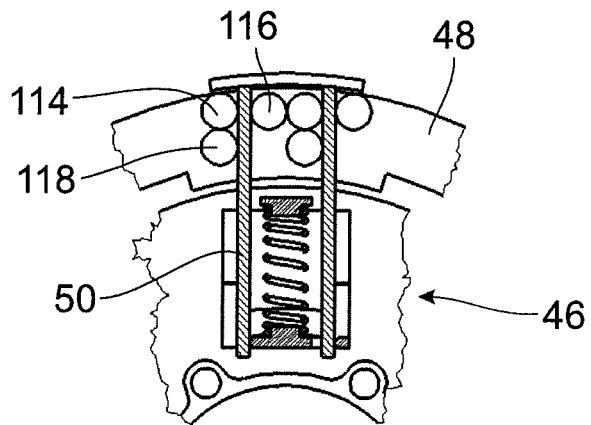
FIG. 19 is a detail showing the connection of two damper springs to a damper mass.

FIG. 19 shows an alternative type of clamping of the damper springs 50 at the damper mass 48 by bolt-like clamping elements provided, for example, by spacer pieces. It can be seen that a pair of spacer pieces 114, 116, which are located opposite one another in circumferential direction and provided at both sides of a respective damper spring 50, are only provided radially outwardly. Farther radially inward, a spacer piece 118 is only provided at one circumferential side. During transmission of force between damper mass 48 and carrier 46, the two diametrically opposite spacer pieces 116, 118 are loaded so that they should be configured to be harder than spacer piece 114 in the above-described manner, this spacer piece 114 being formed substantially to generate the pressing force for pressing the damper spring 50 against the spacer piece 116.

Figure 20:
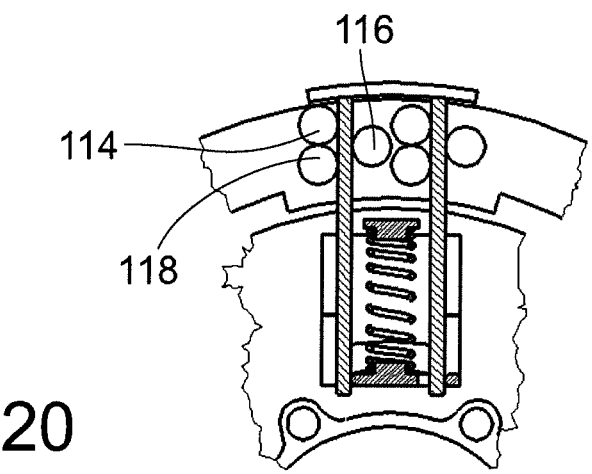
FIG. 20 is a view of an alternative configuration type corresponding to FIG. 19.

FIG. 20 shows a modification in which the individual spacer piece 116 is displaced farther radially inward and is centered in radial direction approximately between the two spacer pieces 114, 118.

Figure 23:
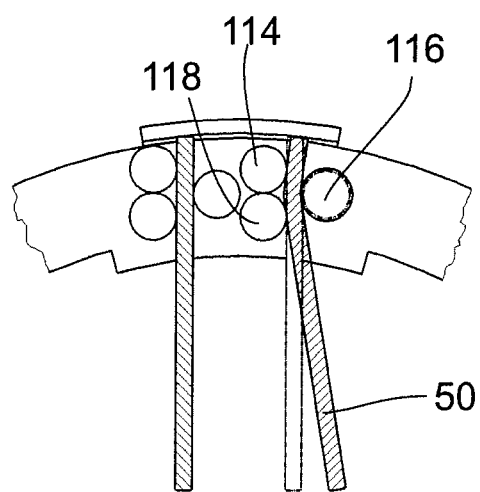
FIG. 23 is a further view of an alternative configuration type corresponding to FIG. 19.

A substantial advantage of this embodiment form consists in that, as shown in FIG. 23, the positioning of the respective damper springs 50 can be corrected by correspondingly stronger deformation of the spacer piece 116 that can then be formed in this case as softer spacer piece.

A further result of this variant shown in FIGS. 20 and 23 compared to the variant shown in FIG. 19 consists in that the free length of damper spring 50 available for deformation is somewhat shorter and thus generally somewhat stiffer owing to spacer piece 116 being positioned farther inside.

Figure 21:
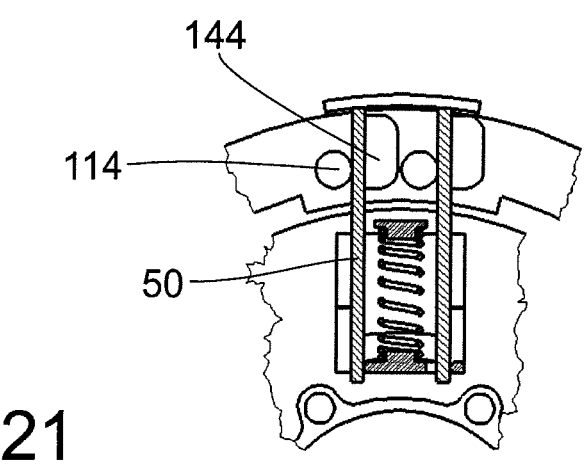
FIG. 21 is a further view of an alternative configuration type corresponding to FIG. 19.

FIG. 21 shows a configuration variant in which a spacer piece 114, which is formed as a spacer bolt, i.e., is shaped like a rivet bolt, is provided at a circumferential side of a respective damper spring 50, while a spacer piece or shaped piece 144 providing an essentially areal support is provided at the other circumferential side. This can also be fastened to the damper mass 48 by riveting.

Figure 22:
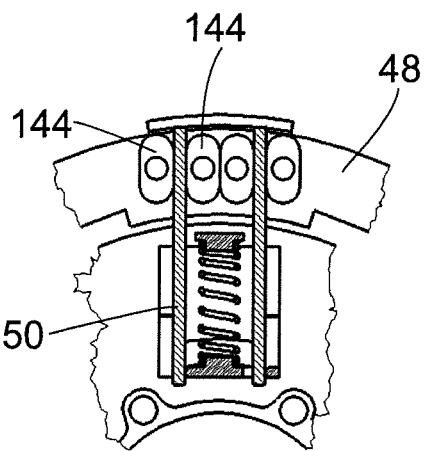
FIG. 22 is a further view of an alternative configuration type corresponding to FIG. 19.

FIG. 22 shows a variant in which a shaped piece 144 of this kind which provides a substantially areal support is associated with each damper spring 50 and provided on both sides thereof. This shaped piece 144 can simultaneously also have the functionality of the fixed connection or of defining a fixed distance between the clamping ring halves 110, 112 of the damper mass 48. Also in the embodiment forms shown in FIGS. 21 and 22, the shaped pieces 144 and, as in FIG. 21, possibly spacer piece 114, are advantageously hardened at least in that area, i.e., length area, in which a support, or increased supporting action, of the damper spring is carried out during the transmission of force.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A torsional vibration damping arrangement, comprising:
   a carrier configured to be driven in rotation;
   a damper spring;
   a damper mass that is rotatably deflectable with respect to the carrier against a restoring action of the damper spring, wherein the damper spring is fixedly clamped in the damper mass and is one of supported or supportable with respect to the carrier for transmitting circumferential force; and
   clamping elements arranged at both sides of the damper spring in circumferential direction configured to clamp the damper spring therebetween,
   wherein at least one clamping element arranged at one circumferential side of the damper spring is harder than at least one clamping element arranged at an other circumferential side of the damper spring.

2. The torsional vibration damping arrangement according to claim 1, wherein at least one of:
   the at least one harder clamping element is constructed with a metal material and is hardened at least in a region cooperating with the damper spring, and
   the at least one softer clamping element is constructed with a non-hardened metal material in at least a region cooperating with the damper spring.

3. The torsional vibration damping arrangement according to claim 1,
   wherein the damper spring is clamped between clamping elements located opposite one another in pairs in circumferential direction,
   wherein one of the clamping elements of a pair of clamping elements is a harder clamping element and an other clamping element of the pair of clamping elements is a softer clamping element,
   wherein two pairs of clamping elements are provided radially successively, and
   wherein the harder clamping element of a radially outer pair of clamping elements and the softer clamping element of a radially inner pair of clamping elements are preferably provided at a circumferential side of the damper spring.

4. The torsional vibration damping arrangement according to claim 1,
   wherein at least one harder clamping element is provided at each circumferential side of the damper spring, wherein harder clamping elements are arranged at different circumferential sides of the damper spring and are arranged to be radially offset relative to one another.

5. The torsional vibration damping arrangement according to claim 1, wherein a circumferential force is transmitted by the damper spring between the carrier and the damper mass in only one circumferential direction.

6. The torsional vibration damping arrangement according to claim 5, wherein at least one clamping element loaded by transmission of a circumferential force through the damper spring is a harder clamping element.

7. The torsional vibration damping arrangement according to claim 1,
   wherein at least one of the damper spring is a leaf spring and a plurality of damper springs are provided successively in circumferential direction,
   wherein a first portion of the damper springs is configured to transmit a circumferential force between the carrier and the damper mass in a circumferential direction, and a second portion of the damper springs configured to transmit a circumferential force between the carrier and the damper mass in a second circumferential direction opposite the first circumferential direction.

8. The torsional vibration damping arrangement according to claim 1, wherein the damper mass comprises:
   a clamping ring with a first clamping ring half and a second clamping ring half located opposite the first clamping ring half,
   wherein the first clamping ring half and second clamping ring half are connected to one another through spacer pieces,
   wherein at least one spacer piece provides a clamping element,
   wherein at least the spacer pieces that provide a softer clamping element are formed as rivet bolts.

9. The torsional vibration damping arrangement according to claim 8, wherein when the clamping ring halves are connected by the spacer pieces providing clamping elements, the spacer pieces providing a softer clamping element in each instance are plastically deformed for play-free clamping of damper springs.

10. The torsional vibration damping arrangement according to claim 1, wherein the carrier comprises:
    a control disk that comprises a first control disk half and a second control disk half connected to the first control disk half;
    a sliding block arranged at the control disk so as to be associated with the damper spring such that it is displaceable radially outward against a force of a sensor spring for circumferential force support of the damper spring with respect to the control disk.

11. The torsional vibration damping arrangement according to claim 1, wherein the damper spring extends substantially radially.

12. A hydrodynamic torque converter comprising:
a housing;
an impeller wheel at the housing;
a turbine wheel in the housing;
a stator;
a lockup clutch;
a vibration-reducing system connecting the lockup clutch to a hub; and
the torsional vibration damping arrangement according to claim 1.

13. The hydrodynamic torque converter according to claim 12, wherein the turbine wheel is coupled with the hub via the torsional vibration damping arrangement.

14. The hydrodynamic torque converter according to claim 12, wherein the torsional vibration damping arrangement is coupled with the hub via the vibration-reducing system.

15. The hydrodynamic torque converter according to claim 12, wherein the torsional vibration damping arrangement is coupled with the hub downstream of the vibration-reducing system.

16. The torsional vibration damping arrangement according to claim 1, wherein the torsional vibration damping arrangement is a mass damper subassembly.

* * * * *